Sept. 29, 1964     K. R. NEVITT     3,150,640
PROTECTIVE RESTRAINT BAG FOR ANIMALS
Filed Aug. 1, 1963

INVENTOR.
KEM R. NEVITT
BY
*Robert E Breidenthal*
ATTORNEY

United States Patent Office 3,150,640
Patented Sept. 29, 1964

3,150,640
PROTECTIVE RESTRAINT BAG FOR ANIMALS
Kem R. Nevitt, P.O. Box 365, Fredonia, Kans.
Filed Aug. 1, 1963, Ser. No. 299,253
13 Claims. (Cl. 119—96)

This invention relates to new and useful improvements in bags providing protective restraint for animals undergoing veterinary treatment, and more particularly pertains to such a bag that is substantially impervious to liquid and which can withstand repeated steam sterilization procedures.

In veterinary treatment of small quadrupeds, it is often the practice to place the animal in a protective restraint bag which will accommodate the body and limbs of the animal with the neck extending through an opening provided therefor so as to dispose the head of the animal outside the bag.

The conventional bag of this type is also provided with one or more closable openings for affording access by the veterinary to selected portions of the body or limbs of the animal undergoing treatment. The conventional bag used for this purpose is preferably of such size as to be quite restrictive of freedom of body and limb movement though this desideratum cannot always be met unless an assortment of bag sizes are available (which is in fact seldom if ever the case) considering the variation in the sizes of animals that would be treated. A veterinary will usually at most have only one bag of this type (commonly referred to as a "cat bag") at his disposal and then it becomes a matter of concern that the smaller animals undergoing treatment cannot escape through a neck opening made large enough to accommodate a larger animal. At best, conventional cat bags may have some stepwise adjustment of the size of the neck opening, but even with this provision either an undesirable open gap or an equally undesirable bunching or folding will frequently occur adjacent any adjustable closure means (on respective use with large or small animals) so as to permit troublesome animal freedom or to impede the veterinary in his diagnosis or treatment.

It is a matter of concern that the bag have sufficient strength to withstand tearing, and in the treatment of animals such as cats that the veterinary not be subjected to being scratched by claws that may puncture or penetrate the bag.

The foregoing desideratums are especially important when treating animals that are not anesthetized, but are nevertheless important when an anesthetized animal recovers in the bag or when the animal is anesthetized after being place in the bag.

Conventional cat bags are made of canvas-like material, and are subject to a number of shortcomings. Among such shortcomings is the fact that conventional canvas-like materials of sufficient weight to be of adequate strength and to afford ample protection against claws penetrating therethrough are of such stiffness as to be difficult to handle, and even more important, to make it very difficult for the veterinary to identify swiftly by his sense of touch (by feeling the animal through the bag) the various portions of the anatomy of the animal. This latter point is of substantial significance as will be appreciated when it is understood that the veterinary must manipulate the animal about in the bag so as to bring the portion of the animal of interest into registry with an access opening (this manipulation being preferably accomplished prior to opening the access opening). Needless to say, this handicap is all the more serious when folding takes place adjacent the neck opening closure means.

Another shortcoming of extant bags is the fact that the neck opening is of substantially fixed size so that a neck opening adequate to accommodate a large animal may allow a smaller animal to escape. While an external strap or rope may be tied about a bag to limit freedom of the body and limbs of a small animal in a large bag (if only one size of bag is available) assuming sufficient bag flexibility, this emergency or makeshift measure is of no avail if the animal can escape through the neck opening before the strap or rope can be secured. This disadvantage alone can often necessitate the veterinary having the services of an assistant. As mentioned previously, extant bags may have some stepwise adjustable closing means (hooks, clips and the like); however, such means does not afford as fine a degree of adjustability as may be necessary (to achieve a snug but not choking fit, for example). Also conventional means of the character indicated above results in a gap adjacent the closing means, or an excessive folding or bunching of material adjacent the closure means.

One of the greatest disadvantages of extant cat bags is the fact that the porous and heavy weight fabric materials become excessively fouled and saturated with objectionable body fluids and wastes such as urine, feces, blood, afterbirth placenta, etc. Not only does such fouling make the cat bag a very difficult and distasteful object to clean, but leaves the bag stained and of such appearance that it is not conducive to confidence on the part of persons witnessing the treatment of their prized pets. Not only is the bag rendered objectionable and stained in appearance to such an extent that it is sometimes difficult to distinguish visually between a cleaned and an uncleaned bag, it has been found difficult to free the bag from odors that are obnoxious as well as frightening to animals which are to be placed therein. These detriments alone are so great in fact as to suppress greatly the use of cat bags despite such advantages they may otherwise afford.

Even further and most serious disadvantages accrue from the porous character of the materials used in extant cat bags in that leakage of body fluids and wastes through the bag can readily contaminate the hands of the veterinary, his instruments, or other instrumentalities that come into contact with the portion of the animal of interest and exposed through the access opening. When surgery or an open wound is involved such that a sterile field is of importance, the risks of infection are as great as they are manifest.

Another point of great and paramount importance closely related to the establishment and maintenance of a sterile field is that the cat bag must not be the vehicle for transference of a communicable or infectious disease from one animal treated in the cat bag to an animal subsequently treated in the same cat bag. Extant cat bags by virtue of their porous nature and the ready adherence to coherent masses of coagulated body fluids and/or body wastes (so as to be resistant to flushing from the material prior to sterilization) are difficult to sterilize properly so as to positively aviod communication of diseases, especially virus diseases such as feline distemper and panleukopenia, as well as such topical diseases as ringworm and microsporum organisms. This is true even of steam sterilization procedures (which may incidentally deleteriously affect materials conventionally used), and especially true of "cold" sterilization procedures by chemicals.

Accordingly, an important object of the instant invention is to provide a protective restraint bag that has a neck opening adjustable in its circumferential extent, and which bag is of sufficient flexibility and thinness to permit ready anatomical identification by feeling therethrough while yet affording great resistance to tearing and a substantial resistance to puncture by claws to protect the veterinary.

Another important object is to provide a bag enabling a veterinary to examine and treat the body and/or limbs with a minimum of risk of injury to both the veterinary and the animal, and which will also enable the veterinary to treat or examine the eyes, mouth, head and neck with a minimum of risk to himself and the animal.

Yet another important object of the invention is to provide a protective restraint bag which is substantially impervious to liquids, which will not readily adhere to coagulated body fluids and/or body wastes and from which soil can largely be readily flushed therefrom by water with or without use of a detergent, and which bag is resistant to permanent staining and permanent retention of odor producing substances.

A paramount object of the invention closely allied to the preceding object is to provide a protective restraint bag which can be repeatedly subjected to steam sterilization procedures (fifteen minutes in contact with steam at 275° F. under fifteen pounds per square inch pressure) without substantial deterioration, and which can be sterilized with substantially greater effectiveness by "cold" sterilization procedures than extant cat bags.

Broadly, one aspect of the invetnion comprises a hollow bag of flexible sheet material, said bag having a neck opening thereinto and adapted to receive the body and limbs of a quarduped therein with the head disposed outside the bag and the neck of the quadruped extending through said opening, said bag having an elongated access opening thereinto that extends from and intersects with the neck opening, slide fastener means for closing said access opening, draw string means provided about the periphery of said neck opening for selectively adjusting the effective circumferential extent of the neck opening, and said flexible sheet material being a coated fabric impervious to liquid and resistant to repeated steam sterilization procedures.

Briefly, another aspect of the invention comprises a hollow bag of flexible sheet material, said bag having a neck opening thereinto and being adapted to receive the body and limbs of a quadruped therein with the head disposed outside the bag and the neck of the quadruped extending through said opening, said bag having an elongated access opening thereinto that extends from and intersects with the neck opening, releasable fastening means carried by the bag at the opposite sides of the access opening for at least partially closing said access opening, said bag being provided with an elongated open-ended pocket of said flexible sheet material extending about the periphery of the neck opening with the open ends of the pocket located at the opposite sides of the access opening, an elongated drawstring disposed in the pocket and having its opposite ends extending from the open ends of the pocket, and a flap of said flexible sheet material secured to the bag along one side of the access opening and underlying the latter when at least partially closed by said fastening means to at least partially seal said access opening, said flexible sheet material being substantially impervious to liquid and comprised of a woven fabric coated with a synthetic substance, said fabric being of woven fiber selected from the group consisting of nylon, polyester, and mixtures thereof, and said substance being selected from the group consisting of silicone rubber, neoprene, chlorosulfonated polyethylene, and mixtures thereof.

Still other aspects of the invention reside in providing additional access openings in the bag, with such additional access openings being provided with releasable fastening means for closing the same.

Other objects, features and aspects of the invention will become apparent as the following description of a preferred embodiment of the invention proceeds, such description to be taken in conjuction with the accompanying drawings illustrative of the preferred embodiment of the invention, wherein.

Figure 1:
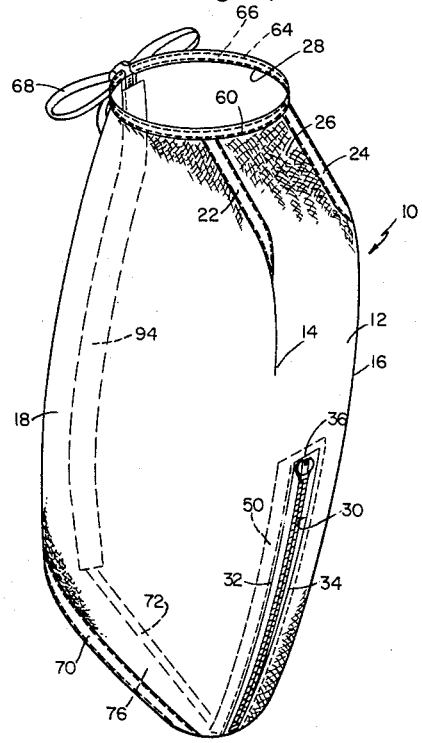
FIGURE 1 is a perspective view of the protective restraint bag showing the same opened to its full extent with the access openings closed and with the drawstring secured.

Referring now to the drawings wherein like reference numerals designate similar parts throughout the various views, the numeral 10 designates the protective restraint bag generally.

The bag 10 is formed in its substantial entirety from a single piece of flat, flexible sheet material, the character of which will be described in detail subsequently. The flexible sheet material includes a back portion gently folded or bent at 14 and 16 to form side panels 18 and 20. Pie-shaped portions of the side panels 18 and 20 are removed along the upper extents of their junctures with the back portion 12, and the marginal portions of the side panels 18 and 20 and the back portion 12 contiguous to such removed portions are seamed and stitched together as indicated at 22 and 24 so that the upper portion of the extent of the back portion 12 is forwardly and upwardly sloping as indicated at 26 to terminate at its upper edge along with the upper edges of the side panels 18 and 20 at a neck opening indicated at 28.

The lower part of the back portion or panel 12 is provided with a vertical and medial elongated slot 30 constituting an access opening having side edges 32 and 34, and an upper edge 36. A slide fastener means designated generally at 38 is provided that includes a slide 40, teeth 42, and a stop 44, and such slide fastener means 38 is stitched at 46 and 48 to margins of the back portions or panel 12 adjacent the edges 32 and 34 of the opening 30 in an arrangement such that when the slide 40 is positioned to close the slide fastener 38 the access opening 30 is closed. Though not essential and of optional character, there is preferably provided a flap 50 within the bag 10 that is marginally secured to the back portion 12 along the edge 34 of the access opening 30 by the line of stitching 38, the flap 50 being in such a position to effectively seal the access opening 30 from within when the slide fastener means 38 is closed. The flap 50 is flat, flexible sheet material of the same character as the back and side panels 12, 18 and 20 of the bag to be presently described. Although the form of slide fastener means 38 illustrated and described is such as to include only one slide so as to be operable to open the access opening 30 from only the upper end of the access opening 30, such slide fastener means 38 can if desired be such as to include two slides located at the opposite ends thereof so that the access opening 30 can be opened from either the upper or lower ends thereof, as desired.

The slide fastener means 38 is comprised of materials resistant to corrosion, and which are resistant to deleterious effects such as might otherwise occur upon the bag 10 being repeatedly subjected to sterilizing procedures at elevated temperatures (each such procedure being at least about as severe as being subjected to steam at 275° under about fifteen pounds per square inch pressure for fifteen minutes). The parts of the slide fastener means 38 that are normally metal in conventional slide fastener means, that is, the slide 40, the teeth 42 and the stop 44 are preferably of a metal that is resistant to corrosion, stainless steel being a preferred material; however, slide fastener means wherein such components are made of synthetic resin such as can withstand the aforementioned sterilization conditions can be employed if desired. The conventional portions of the slide fastener means 38 to which the teeth 42 are secured can be if desired a fabric woven of fibers such as hereinafter described as suitable for the sheet material included in the side and back panels 18, 20 and 12 of the bag. To the extent it may be deemed necessary that the slide fastener means 38 incorporate a resilient material, it is preferred that such resilient material be neoprene rather than natural rubber.

If desired, either or both the side panels 18 and 20 can be provided with one or more access openings with releasable closure means therefor corresponding to the opening 30, means 38 and the optional flap 50 as will be readily understood by those skilled in the art.

The forward edges 52 and 54 of the side panels 18 and 20 are inturned toward each other to define front panel portions 56 and 58. The upper edges of the panels 18, 20, 26, 56 and 58 are folded over about the periphery of the neck opening 28 as indicated at 60, and the lower edge of such folded over portions are stitched adjacent their extremities to the panels 18, 20, 26, 56 and 58 as indicated at 62 to define an open-ended pocket 64 that encircles the neck opening 28 with the open ends of the pocket 64 terminating adjacent the edges 52 and 54 of the front panels 56 and 58 of the bag 10. A drawstring 66 has its intermediate extent disposed in the pocket 64 and the free ends thereof projecting from the open ends of the pocket 64 so that they may be tied together to form an easiliy released bow knot designated at 68. The drawstring 66 is slidable in the pocket 64, and the sheet material from which the panels 18, 20, 26, 56 and 58 are made is sufficiently flexible that the drawstring 66 can be drawn up very snugly through the pocket 64 so that the sheet material forms accordion-like pleats thereabout with the result that the effective size of the neck opening 28 can be restricted in circumferential extent in an adjusted manner as desired, and without excessive bunching or folding.

If desired or deemed expedient to prevent inadvertent withdrawal of the drawstring 66 from the pocket 64, the center of the drawstring can be stitched to the back panel portion 26.

Darts or tucks are taken adjacent the lower extremities of the side panels 18 and 20 and such panels are seamed with stitching as indicated at 68 and 70 (with access material taken up in the forming of such darts or tucks being removed much in the same manner as in the formation of the previously described stitched seams 22 and 24), so that the lower portions of the side panels 18 and 20 can be secured together by a stitched seam 72 along the bottom of the bag 10, to define bottom panels 74 and 76 of the bag 10.

As will be noted in FIGURE 1, the stitched seam 72 is centrally positioned intermediate the side panels 18 and 20 and extends approximately from the bottom rear of the bag 10 to the bottom front of the bag 10. The adjacent edges 52 and 54 of the front panels 56 and 58 are spaced in approximate parallelism from the forward end of the stitched seam 72 centrally of the front of the bag 10 up to the neck opening 28 to define an access opening 80 that intersects with the neck opening 28. The arrangement is such that when the bowknot 68 of the drawstring 66 is untied and the hereinafter described closing means for the access opening 80 is open, the neck opening 28 and the access opening 80 can be opened up into a single large opening by spreading the front panels 56 and 58 apart whereby an animal, such as a cat (not shown), can be easily placed within the bag 10. Slide fastener means designated generally at 82 is provided for releasably closing the access opening 80, such slide fastener means 82 being stitched to the front portions or panels 56 and 58 adjacent the edges 52 and 54 thereof by rows of stitching 84 and 86.

Figure 2:
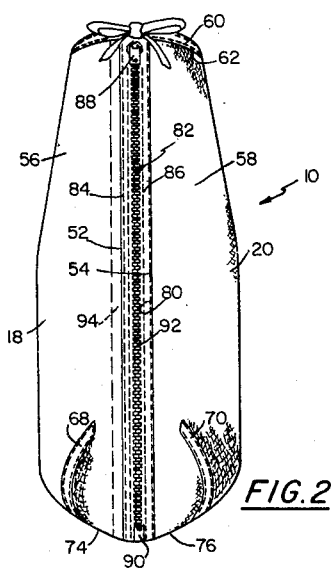
FIGURE 2 is a front elevational view of the bag shown in FIGURE 1 on a reduced scale.
Figure 3:
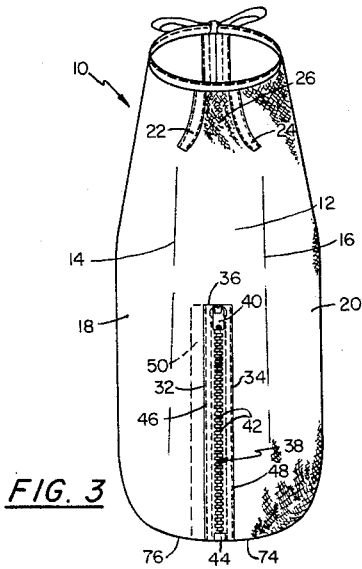
FIGURE 3 is a rear elevational view of the structure shown in FIGURE 2.

The slide fastener means 86 is of the same general nature as the hereinbefore described slide fastener means 38 insofar as the character of the materials from which the same is formed are concerned; however, the slide fastener means 82 preferably includes a pair of slides 88 and 90 operable with respect to the teeth 92 of the slide fastener means 82 from opposite ends of the access opening 80. Thus, the slide 88 can be moved downwardly from the position shown thereof in FIGURE 2 to open an adjustable extent of the upper part of the access opening 80 so that an animal may be readily positioned within the bag 10. On the other hand, the slide 90 may be actuated from the lowermost position thereof shown in FIGURE 2 upwardly so as to open the lower end of the access opening to such an extent as may be desired. As in the case of the access opening 30, the access opening 80 is also optionally though preferably provided with a flap 94 disposed within the bag and stitched to the front panel 58 by the row of stitching 86 so as to effectively seal the access opening 80 against the outward flow of liquids when the slide fastening means 82 are closed. As in the case of the flap 50, it will be noted that the side of the flap 94 opposite the side thereof that is stitched engages the underside of the bag panel on the side of the access opening opposite such stitching.

The character or physical properties of the flat, flexible sheet materials used in the bag 10 is deemed very important. All of the hereinbefore described panels (12, 18, 20, 26, 56, 58, 74 and 76) and the optional flaps 50 and 94 are made of a flat, flexible sheet material comprised of a coated woven fabric that is substantially impervious to liquid. The fibers of the woven fabric are selected from a group consisting of nylon, polyester, and mixtures thereof, with nylon being especially preferred. The woven fabric is coated so as to be imprevious to liquids with the synthetic substance being selected from the group consisting of silicone rubber, neoprene, chlorosulfonated polyethylene, and mixtures thereof, with silicone rubber being especially preferred.

Coated fabrics of the character specified above are resistant to puncture and tearing; are light and remain flexible throughout the range of temperature of use, and can stand up without substantial deleterious effect from repeated sterilizing procedures, wherein each procedure can comprise subjecting the bag 10 to steam under a pressure of about fifteen pounds per square inch at a temperature of about 275° F. for about fifteen minutes. Also, the garment can be easily rinsed or scrubbed in clear or soapy water to free and remove any adhering foreign matter. An incidental advantage is that the coated fabric is somewhat resistant to staining, and can withstand ordinary treatments for removing stains very well.

A coated fabric sheet material found to be well suited for the purpose is marketed by the Connecticut Hard Rubber Company, 407 East Street, New Haven 9, Connecticut, under the manufacturer's designation FGAAO, and specification BMS 1–17A, Type II, Grade B. This material has a thread count of 40 x 42 and a thickness of 0.006". Thread counts of somewhat less than this to about 58 x 42 are especially preferred and a thickness of somewhat less than this to about 0.009" is especially preferred. This same manufacturer also makes and sells a nylon resin coated nylon fabric that can be used. The silicone rubber coated nylon fabric designated by such manufacturer as SGAOI is also useful.

Vinyl plastics may also be useful provided the sterilization temperatures are not excessive. In general, selection of the fabric and the coating should be in keeping with the temperature used during sterilization. If cold sterilization processes (treatment with chemicals) are to be used, choice or selection should be made on basis of resistance to the sterilizing chemicals to be used. It is preferred that the bag be suitable for steam sterilization because such mode of sterilization is deemed much superior.

As hereinbefore employed, the term polyester has reference to synthetic polyester fibers such as marked by E. I. du Pont de Nemours of Wilmington, Delaware, under the trademark "Dacron"; and chlorosulfonated polyethylene makes reference to a synthetic coating material marketed by the same company under the trademark "Hypalon."

It is preferred that the flexible sheet material have a surface finish sufficiently smooth to resist tenacious adherence of foreign matter thereto.

The drawstring 66 can be woven of cotton or woven of fibers of the character previously indicated as suitable for the flat, flexible sheet material. The thread used in all of the stitching of the bag 10 can be of cotton, but it is preferred that such stitching be of thread woven of such fibers as indicated suitable for the sheet material.

In the use of the bag 10, the knot 68 is untied and the slide 88 is pulled down sufficiently for an animal to be placed therein, after which the slide 88 is drawn up to its upper limiting position, it being understood that the body and limbs of the animal are disposed within the bag 10, with the neck of the animal extending through the neck opening 28 and the head of the animal being disposed outside of the bag 10. The drawstring 66 is then drawn up so as to reduce the peripheral extent of the neck opening 28 to make precisely as tight a fitting around the animal's neck as desired, after which the tie or drawstring 66 is knotted as indicated at 68.

After the animal has been positioned in the bag 10 as described, the veterinarian can then maneuver the animal or move the bag 10 about over the body of the animal to such a position that the portion of the animal of interest is disposed in registry with either the access opening 30 or the access opening 80, it being noted that the flexibility and lightness in weight of the sheet material of which the bag 10 is constituted greatly facilitates anatomical identification of the parts of the animal by the veterinarian feeling the animal through the bag 10 as well as the manipulation. After the bag 10 has been suitably positioned on the animal, the appropriate slide fastening means or slide is moved to open the appropriate access opening to the extent necessary, whereupon the veterinarian is able to proceed with the necessary examination, surgery, etc.

After the required examination, surgery, etc., has been completed, the animal may be left within the bag 10 with the access openings closed for such period as may be desired, or the animal may be immediately removed. After use of the bag 10, the same can be readily hosed or otherwise rinsed or scrubbed, and thereafter placed in a sterilizing autoclave to ready the same for subsequent use. The adaptability of the bag 10 to steam sterilization greatly minimizes the possibility of subsequent use of the bag 10 spreading such communicable diseases as feline distemper, panleukopenia and topical organisms as microsporum.

An important advantage of the bag 10 being made of the character of sheet materials hereinbefore specified resides in the fact that the bag 10 is of exceptionally high strength, flexible while yet offering resistance to tearing by cats' claws and the like.

Inasmuch as the invention is obviously susceptible to numerous variations and modifications of the illustrated, described and preferred embodiment, the latter having been described in extensive detail only to convey a full and complete understanding of the basic principles of the invention; attention is directed to the appended claims in order to ascertain the actual scope of the invention.

I claim:

1. A protective restraint for facilitating the treatment of quadrupeds comprising a hollow bag of flexible and liquid impervious sheet material, said bag having a neck opening thereinto and adapted to receive the body and limbs of a quadruped therein with the head disposed outside of the bag and the neck of the quadruped extending through said opening, said bag having an elongated access opening thereinto that extends from and intersects with the neck opening, slide fastener means for closing said access opening, drawstring means provided about the periphery of said neck opening for selectively adjusting the effective circumferential extent of the neck opening, said last means comprising the bag being provided with an elongated open-ended pocket of said flexible sheet material extending about the periphery of the neck opening with the open ends of the pocket located at opposite sides of the access opening at one extremity of the slide fastener means, an elongated drawstring slidingly disposed in the pocket and having its opposite ends extending from the open ends of the pocket, and said flexible sheet material being a coated fabric impervious to liquid and resistant to repeated steam sterilization procedures.

2. The combination of claim 1, wherein said slide fastener means includes a pair of slides operable from adjacent the opposite extremities of the access opening.

3. The combination of claim 2, wherein the bag includes a flap of said flexible and liquid impervious material secured to the bag along one side edge of said access opening to underlie and effectively seal the access opening when the latter is closed by the slide fastener means.

4. A protective restraint for facilitating the treatment of quadrupeds comprising a hollow bag of flexible and liquid impervious sheet material, said bag having a neck opening thereinto and adapted to receive the body and limbs of a quadruped therein with the head disposed outside of the bag and the neck of the quadruped extending through said opening, said bag having an elongated access opening thereinto that extends from and intersects with the neck opening, slide fastener means including a pair of slides for closing said access opening, drawstring means provided about the periphery of said neck opening for selectively adjusting the effective circumferential extent of the neck opening, said last means comprising the bag being provided with an elongated open-ended pocket of said flexible sheet material extending about the periphery of the neck opening with the opposite ends of the pocket located at opposite sides of the access opening at one extremity of the slide fastener means, an elongated drawstring slidingly disposed in the pocket and having its opposite ends extending from the open ends of the pocket, said bag having a further elongated access opening that is spaced from the neck opening and which is in part substantially diametrically opposed to the first-mentioned access opening, and a further slide fastener means for closing said further access opening.

5. The combination of claim 4, including flaps of said flexible and liquid impervious material secured to the bag along side edges of said access openings to underlie and effectively seal such access openings when the latter are closed by the slide fastener means respectively associated therewith.

6. A protective restraint for facilitating the treatment of quadrupeds comprising a hollow bag of flexible and liquid impervious sheet material, said bag having a neck opening thereinto and being adapted to receive the body and limbs of a quadruped therein with the head disposed outside the bag and the neck of the quadruped extending through said opening, said bag having an elongated access opening thereinto that extends from and intersects with the neck opening, slide fastener means carried by the bag and extending along the opposite sides of the access opening for closing said access opening, said bag being provided with an elongated, open-ended pocket of said flexible sheet material extending about the periphery of the neck opening with the open ends of the pocket located at the opposite sides of the access opening at one extremity of the slide fastener means, an elongated drawstring slidingly disposed in the pocket and having its opposite ends extending from the open ends of the pocket, said flexible sheet material being impervious to liquid and comprised of a woven fabric together with a synthetic coating selected from the group consisting of silicone rubber, neoprene, chlorosulfonated polyethylene, and mixtures thereof.

7. The combination of claim 6, wherein said coating is silicone rubber.

8. The combination of claim 6, wherein said coating is neoprene.

9. A protective restraint for facilitating the treatment of quadrupeds comprising a hollow bag of flexible and liquid impervious sheet material, said bag having a neck opening thereinto and being adapted to receive the body and limbs of a quadruped therein with the head disposed outside the bag and the neck of the quadruped extending through said elongated access opening thereinto that extends from and intersects with the neck opening, slide fastener means carried by the bag and extending along the opposite sides of the access opening for closing said access opening, said bag being provided with an elongated open-ended pocket of said flexible sheet material extending about the periphery of the neck opening with the open ends of the pocket located at the opposite sides of the access opening at one extremity of the slide fastener means, an elongated drawstring slidingly disposed in the pocket and having its opposite ends extending from the open ends of the pocket, said flexible sheet material being impervious to liquids and is comprised of a woven fabric that has a synthetic coating, said fabric being woven of fibers composed of a substance selected from the group consisting of nylon, polyester, and mixtures thereof.

10. The combination of claim 9, wherein said fibers are nylon.

11. The combination of claim 9, wherein said fibers are a synthetic polyester.

12. The combination of claim 9, wherein the fibers are nylon and the synthetic coating is silicone rubber.

13. A protective restraint for facilitating the treatment of quadrupeds comprising a hollow bag of flexible and liquid impervious sheet material, said bag having a neck opening thereinto and being adapted to receive the body and limbs of a quadruped therein with the head disposed outside the bag and the neck of the quadruped extending through said opening, said bag having an elongated access opening thereinto that extends from and intersects with the neck opening, slide fastener means carried by the bag and extending along the opposite sides of the access opening for closing said access opening, said bag being provided with an elongated open-ended pocket of said flexible sheet material extending about the periphery of the neck opening with the open ends of the pocket located at the opposite sides of the access opening at one extremity of the slide fastener means, an elongated drawstring slidingly disposed in the pocket and having its opposite ends extending from the open ends of the pocket, and a flap of said flexible sheet material secured to the bag along one side of the access opening and underlying the latter when closed by said slide fastener means to at least partially seal said access opening, said flexible sheet material being substantially impervious to liquid and comprised of a woven fabric coated with a synthetic substance, said fabric being of woven fibers selected from the group consisting of nylon, polyester, and mixtures thereof, and said substance being selected from the group consisting of silicone rubber, neoprene, chlorosulfonated polyethylene, and mixtures thereof.

References Cited in the file of this patent
UNITED STATES PATENTS

| | | |
|---|---|---|
| 2,273,706 | Hafner | Feb. 17, 1942 |
| 2,536,943 | Kessel | Jan. 2, 1951 |
| 2,721,811 | Dacey et al. | Oct. 25, 1955 |
| 2,854,425 | Boger et al. | Sept. 30, 1958 |
| 2,969,767 | Bassett | Jan. 31, 1961 |
| 3,108,568 | Whitney et al. | Oct. 29, 1963 |